(12) United States Patent
Herrmann et al.

(10) Patent No.: US 10,878,552 B2
(45) Date of Patent: *Dec. 29, 2020

(54) METHOD AND DEVICE FOR MATERIAL WEB MONITORING AND MATERIAL WEB INSPECTION

(71) Applicant: Texmag GmbH Vertriebsgesellschaft, Thalwil (CH)

(72) Inventors: Markus Herrmann, Augsburg (DE); Manfred Kroehn, Augsburg (DE)

(73) Assignee: TEXMAG GMBH VERTRIEBSGESELLSCHAFT, Thalwil (CH)

( * ) Notice: Subject to any disclaimer, the term of this patent is extended or adjusted under 35 U.S.C. 154(b) by 23 days.

This patent is subject to a terminal disclaimer.

(21) Appl. No.: 15/788,333

(22) Filed: Oct. 19, 2017

(65) Prior Publication Data

US 2018/0114308 A1 Apr. 26, 2018

(30) Foreign Application Priority Data

Oct. 21, 2016 (DE) .................. 10 2016 220 757

(51) Int. Cl.
*G06T 7/00* (2017.01)
*H04N 5/345* (2011.01)
(Continued)

(52) U.S. Cl.
CPC ....... *G06T 7/0004* (2013.01); *G01N 21/8851* (2013.01); *G01N 21/8901* (2013.01);
(Continued)

(58) Field of Classification Search
CPC .............. G06T 7/0004; G01N 21/8851; G01N 21/8901; H04N 5/23296; H04N 5/247; H04N 5/347
(Continued)

(56) References Cited

U.S. PATENT DOCUMENTS

2005/0226466 A1   10/2005   Seymour
2010/0214416 A1   8/2010    Ruuska
(Continued)

FOREIGN PATENT DOCUMENTS

EP     2 003 443 A1    12/2008
WO     2012049370 A1   4/2012

OTHER PUBLICATIONS

European Patent Office Search Report for European Patent Application No. 17195965.3 dated Mar. 5, 2018 and European Patent Office—Office Action for European Patent Application No. 17195965.3 dated Mar. 19, 2018.

*Primary Examiner* — On S Mung
(74) *Attorney, Agent, or Firm* — Shumaker, Loop & Kendrick, LLP (57) ABSTRACT

A device and a method for monitoring and/or inspecting moving material webs. The method includes taking a first picture of a first portion of a material web at a first point in time with a camera, which has a matrix chip with a binning function, and taking a second picture of a second portion of the material web at a second point in time with the camera. A first binning step level is used for the first picture and a second binning step level is used for the second picture. The first number of pixels which are in each case grouped together is higher or lower than the second number of pixels which are in each case grouped together, as a result of which a physical zoom function is achieved for the second picture.

34 Claims, 6 Drawing Sheets

(51) Int. Cl.
    *G01N 21/89*  (2006.01)
    *G06T 7/70*  (2017.01)
    *G01N 21/88*  (2006.01)
    *H04N 5/232*  (2006.01)
    *H04N 5/247*  (2006.01)
    *H04N 5/347*  (2011.01)

(52) U.S. Cl.
    CPC ........... *G01N 21/8903* (2013.01); *G06T 7/70* (2017.01); *H04N 5/23296* (2013.01); *H04N 5/247* (2013.01); *H04N 5/347* (2013.01); *H04N 5/3454* (2013.01); *G01N 2021/8864* (2013.01); *G01N 2021/8867* (2013.01); *G06T 2207/10148* (2013.01); *G06T 2207/10152* (2013.01); *G06T 2207/30124* (2013.01)

(58) Field of Classification Search
    USPC .......................................................... 348/88
    See application file for complete search history.

(56) References Cited

U.S. PATENT DOCUMENTS

| | | |
|---|---|---|
| 2011/0141269 A1 | 6/2011 | Varga |
| 2012/0013733 A1 | 1/2012 | Koltermann |
| 2015/0077538 A1 | 3/2015 | Krebs |

METHOD AND DEVICE FOR MATERIAL WEB MONITORING AND MATERIAL WEB INSPECTION

FIELD OF THE INVENTION

The present invention relates to a method and a device for material web monitoring and material web inspection for machines with continually transported products, such as material webs.

BACKGROUND OF THE INVENTION

When products are manufactured in the form of material webs, such as printed products like labels or packaging, monitoring and/or automated quality assurance after printing are of considerable importance in order to check the printed product. In addition to automated monitoring, help with visual monitoring by an operator can also be provided for here. In this type of quality assurance, the material webs are passed through monitoring or inspection systems that take pictures of the material webs. These pictures can be checked by an operator or automatically. Zoom functions are provided for so that corresponding areas of the material web can be monitored or inspected in more detail. These are provided in known applications by means of zoom lenses or systems with multiple cameras (what are referred to as dual view camera systems) or additional movable cameras for detailed pictures (see, for example, DE 10 2012 101 310 B3).

The disadvantages of such systems are the high costs and the mechanically and electrically complex implementation. Such systems are also prone to failure and therefore need a lot of maintenance. A relatively large amount of space is also required both for the use of zoom lenses and the use of systems with multiple cameras.

The aim of the present invention is therefore to provide a device and a method which provide a zoom function whilst having a compact construction and being less prone to failure and less complex.

SUMMARY OF THE INVENTION

The present invention relates to a method for monitoring and/or inspecting material webs according to claim 1 and a device for monitoring and/or inspecting material webs according to claim 21.

The method according to the invention for monitoring and/or inspecting material webs which are moving in the direction of a material web length y and/or in the direction of a material web width x comprises the following steps: taking a first picture of a first portion of a material web at a first point in time with a camera which comprises a matrix chip with a binning function, and taking a second picture of a second portion of the material web at a second point in time with the camera, wherein, for the first picture, a first binning step level is used in which in each case a first number of pixels of the matrix chip are grouped together using the binning function and, for the second picture, a second binning step level is used in which in each case a second number of pixels of the matrix chip are grouped together using the binning function, and wherein the first number of pixels which are in each case grouped together is higher or lower than the second number of pixels which are in each case grouped together, as a result of which a physical zoom function is achieved for the second picture. The particular advantage of this method is that a physical zoom function can be provided without any additional complex instruments, such as a zoom lens or additional cameras.

In configurations, the first portion and the second portion may be two identical or corresponding material web portions or the second portion may be a subsidiary portion or a corresponding subsidiary portion of the first portion of the material web.

In configurations, which may be combined with all previously described configurations, for the first picture, a first active area of the matrix chip may be used in order to cover a first field of vision and, for the second picture, a second active area of the matrix chip may be used in order to cover a second field of vision. In particular, the first active area and correspondingly the first field of vision may be as large as or larger than the second active area and correspondingly the second field of vision. The second active area may be the same active area of the matrix chip as the first active area or may be part of the first active area. In particular, the second active area may be arranged within the first active area. An advantage of this method, for example, is the reduction in the amount of data and the computer power required through use of the binning function and of a "Region of Interest" (ROI) function, because only the resolution required in each case or the field of vision required in each case is captured and processed. A lower data load in turn also allows the image capture frequency (frames per second: "FPS") to be increased.

In configurations, which may be combined with all previously described configurations, the method may also comprise the following steps: displaying the first picture for a user, taking the second picture in response to a user input and displaying the second picture for the user. The second binning step level and optionally the second field of vision can be selected as a function of the user input.

In configurations, which may be combined with all previously described configurations, the first active area and the second active area may not be identical. In particular, the first area and the second area may or may not overlap. The method may also comprise the following steps: evaluating the first picture and determining a position of at least one error on the material web and selecting the second binning step level and/or the second active area on the basis of the position of the error on the material web. This is advantageous if the field of vision in the x and y directions can be limited to the position of the error, It is then possible, for example, to reduce the binning step level still further and therefore to achieve a higher resolution for the zoom function without increasing the amount of data in the second picture. Moreover, the second picture may also be taken at the second point in time on the basis of the position of the error.

The second active area and/or the second point in time of the second pictures may in additional also be determined as a function of a material web speed at which the material web moves, For the second active area, a position in the direction of the material web length y, a position in the direction of the material web width x and/or a variable based on the position of the error and the size of the error may be determined. The position of a multiplicity of errors may also be determined and a corresponding multiplicity of second pictures may be taken, In configurations, which may be combined with all previously described configurations, the matrix chip may be divided into first and second parts, wherein the first part operates at the first binning step level and is used for the first picture and the second part operates at the second binning step level and is used for the second picture. In particular, the second part may lie behind the first part in the direction of movement of the material web. Provision may be made for the second part only to be activated if an error has been found in the first picture. The first part may be larger than the second part, in particular the first part may be at least twice as large, at least three times as large, at least five times as large, or at least nine times as large as the second part. Provision may be made for first pictures continually to be taken with the first part and second pictures continually to be taken with the second part. In particular, the second pictures may continually be saved in a ring memory. Corresponding second pictures may be read from the ring memory and/or provided and/or displayed, for example on a monitor, for a user if at least one error has been found in corresponding first pictures. Both the first pictures and the second pictures may cover the whole of the material web.

In configurations, which may be combined with all previously described configurations, when binning step levels of the binning function are used, the pixels in a first direction, in particular in the direction of the material web length y, in a second direction, in particular in the direction of the material web width x, or in combination in the first direction and the second direction, may be grouped together. When binning step levels of the binning function are used, the pixels of the matrix chip may be grouped together so that, for example, virtual pixels having a pixel size of 1×2, 1×3, 1×4, 1×5, 1×6, 1×7, 1×8, 1×9, 1×10, 1×11, 2×1, 3×1, 4×1, 5×1, 6×1, 7×1, 8×1, 9×1, 10×1, 11×1, 2×2, 3×2, 2×3, 4×2, 2×4, 5×2, 2×5, 6×2, 2×6, 7×2, 2×7, 8×2, 2×8, 9×2, 2×9, 10×2, 2×10, 11×2, 2×11, 3×3, 4×3, 3×4, 5×3, 3×5, 6×3, 3×6, 7×3, 3×7, 8×3, 3×8, 9×3, 3×9, 10×3, 3×10, 11×3, 3×11, 4×4, 5×4, 4×5, 6×4, 4×6, 7×4, 4×7, 8×4, 4×8, 9×4, 4×9, 10×4, 4×10, 11×4, 4×11, 5×5, 6×5, 5×6, 7×5, 5×7, 8×5, 5×8, 9×5, 5×9, 10×5, 5×10, 11×5, 5×11, 6×6, 7×6, 6×7, 8×6, 6×8, 9×6, 6×9, 10×6, 6×10, 11×6, 6×11, 7×7, 8×7, 7×8, 9×7, 7×9, 10×7, 7×10, 11×7, 7×11, 8×8, 9×8, 8×9, 10×8, 8×10, 11×8, 8×11, 9×9, 10×9, 9×10, 11×9, 9×11, 10×10, 11×10, 10×11 or 11×11 pixels are produced.

In configurations, which may be combined with all previously described configurations, a digital zoom may also be used, in particular through interpolation of a number of adjacent physical pixels or virtual pixels which are produced when the binning function is used in order to cover transition areas in the resolution between corresponding binning step levels. This is advantageous in the method according to the invention because the physical resolution is repeatedly adjusted through the binning step levels so that any deterioration through the use of the digital zoom is barely noticeable. In other words, before a picture looks blurred or pixelated as a result of excessive digital zoom and corresponding interpolation, the next binning step level which provides a higher physical resolution again can be used.

In configurations, which may be combined with all previously described configurations, for the first and second pictures, the active areas of the matrix chip and the binning step levels, and optionally the use of a digital zoom, are matched to one another such that an infinitely variable zoom function is provided.

In configurations, which may be combined with all previously described configurations, the method may also comprise the following step: as a function of a maximum physical resolution of the matrix chip, determining an optimum ratio based in each case on the active area of the matrix chip and the binning step level used, and hi particular determining the optimum properties for a lens optionally used for the pictures.

In configurations, which may be combined with all previously described configurations, the material web may have repeats, wherein a corresponding trigger signal is provided per repeat, wherein the first point in time of the first picture may be determined by a first trigger signal and the second point in time of the second picture may be determined by a second trigger signal so that the first and second portions represent corresponding portions on the material web.

In configurations, which may be combined with all previously described configurations, the matrix chip may have a resolution of at least 16 megapixels, at least 32 megapixels, at least 50 megapixels, at least 70 megapixels or at least 100 megapixels.

In configurations, which may be combined with all previously described configurations, the method may also comprise the following step: taking an additional picture of the first portion at a third point in time using the first binning step level, wherein a different active area of the matrix chip is used for the additional picture of the first portion than for the first picture of the first portion. The third point in time may be after the first point in time. In particular, the third point in time is before the second point in time or after the second point in time. Different types of lighting may be used to light the material web for the two pictures of the first portion. The method may also comprise the following step: taking an additional picture of the second portion at a fourth point in time using the second binning step level, wherein a different active area of the matrix chip is used for the additional picture of the second portion than for the second picture of the second portion. The fourth point in time may be after the second or after the third point in time. The same type of lighting may be used for the additional picture of the second portion as for the additional picture of the first portion, in particular a different type of lighting than for the second picture of the second portion.

In configurations, which may be combined with all previously described configurations, a multiplicity of cameras may be used, each of which has a matrix chip with a binning function, wherein each of the cameras takes pictures corresponding to the preceding embodiments. The cameras may be arranged distributed over the material web width x so that the fields of vision of the cameras in the direction of the material web width x adjoin one another or overlap. A coherent picture may be established from the pictures of the multiplicity of cameras. Mechanical offsets of the cameras with respect to one another in the direction of the material web length y can also be compensated for through a corresponding selection of active areas of the matrix chips.

The invention also comprises a device for monitoring and/or inspecting material webs which are moving in the direction of a material web length y and/or a material web width x. The device comprises a camera which comprises a high-resolution matrix chip, wherein the matrix chip has a binning function and a control unit. The control unit is designed to have a first picture of a first portion of the material web taken at a first point in time, and a second picture of a second portion of the material web taken at a second point in time, wherein a first binning step level is used for the first picture, in each case a first number of pixels of the matrix chip being grouped together using the binning function, and a second binning step level being used for the second picture, in each case a second number of pixels of the matrix chip being grouped together using the binning function. The first number of pixels which are in each case grouped together is higher or lower here than the second number of pixels which are in each ease grouped together, as a result of which a physical zoom function is achieved for the second picture.

In configurations, the device may also comprise a lens with a fixed focal length.

In configurations of the device, which may be combined with all previously described configurations, the first portion and the second portion may be two identical or corresponding material web portions or the second portion may be a subsidiary portion or a corresponding subsidiary portion of the first portion of the material web.

In configurations of the device, which may be combined with all previously described configurations, the control unit may be designed, for the first picture, to use a first active area of the matrix chip in order to cover a first field of vision and, for the second picture, to use a second active area of the matrix chip in order to cover a second field of vision. In particular, the first active area and correspondingly the first field of vision may be as large as or larger than the second active area and correspondingly the second field of vision. The second active area may be the same active area of the matrix chip as the first active area or may be part of the first active area. In particular, the second active area may lie within the first active area.

In configurations of the device, which may be combined with all previously described configurations, the device may also comprise a display and the control unit may be designed to have the first picture displayed for a user on the display, to have the second picture taken in response to a user input and to have the second picture displayed for the user on the display. The control unit may be designed to select the second binning step level and optionally the second field of vision as a function of the user input.

In configurations of the device, which may be combined with all previously described configurations in which the active areas do not have to be identical, the first active area and the second active area may not be identical, in particular wherein the first area and the second area overlap or do not overlap. The control unit may be designed to evaluate the first picture and to determine a position of at least one error on the material web and to determine the second binning step level and/or the second active area on the basis of the position of the error on the material web. The control unit may be designed to take the second picture at the second point in time on the basis of the position of the error. The control unit may also be designed to determine the second active area and/or the second point in time of the second picture as a function of a material web speed at which the material web moves. The control unit may also be designed to determine, for the second active area, a position in the direction of the material web length y, a position in the direction of the material web width x and/or a variable based on the position of the error and the size of the error. The control unit may be designed to determine the position of a multiplicity of errors and to have a corresponding multiplicity of second pictures taken.

In configurations of the device, which may be combined with all previously described configurations, the device may also comprise a sensor which is designed to determine the distance travelled by or the speed of the material web in the direction of the material web length and to provide corresponding signals.

In configurations of the device, which may be combined with all previously described configurations, the matrix chip may be divided into first and second parts, wherein the first part operates at the first binning step level and is used for the first picture and the second part operates at the second binning step level and is used for the second picture. In particular, the second part may be arranged behind the first part in the direction of movement of the material web. The control unit may be designed to activate the second part only if an error has been found in the first picture. The first part may be larger than the second part. In particular, the first part may at least twice as large, at least three times as large, at least five times as large, or at least nine times as large as the second part. The control unit may be designed to have first pictures continually taken with the first part and second pictures continually taken with the second part. In particular, the second pictures may continually be saved in a ring memory. The control unit may be designed to have corresponding second pictures read from the ring memory and/or provided and/or displayed on a display for a user if at least one error has been found in corresponding first pictures. The device may be designed so that both the first pictures and the second pictures cover the whole of the material web.

In configurations of the device, which may be combined with all previously described configurations, the control unit may be designed, when binning step levels of the binning function are used, to have the pixels in a first direction, in particular in the direction of the material web length y, in a second direction, in particular in the direction of the material web width x, or in combination in the first direction and the second direction, grouped together. The control unit may be designed, when binning step levels of the binning function are used, to have the pixels of the matrix chip grouped together so that virtual pixels having a pixel size of 1×2, 1×3, 1×4, 1×6, 1×6, 1×7, 1×8, 1×9, 1×10, 1×11, 2×1, 3×1, 4×1, 5×1, 6×1, 7×1, 8×1, 9×1, 10×1, 11×1, 2×2, 3×2, 2×3, 4×2, 2×4, 5×2, 2×5, 6×2, 2×6, 7×2, 2×7, 8×2, 2×8, 9×2, 2×9,10×2, 2×10, 11×2, 2×11, 3×3, 4×3, 3×4, 5×3, 3×5, 6×3, 3×6, 7×3, 3×7, 8×3, 3×8, 9×3, 3×9, 10×3, 3×10, 11×3, 3×11, 4×4, 5×4, 4×5, 6×4, 4×6, 7×4, 4×7, 8×4, 4×8, 9×4, 4×9, 10×4, 4×10, 11×4, 4×11, 5×5, 6×5, 5×6, 7×5, 5×7, 8×5, 5×8, 9×5, 5×9, 10×5, 5×10, 11×5, 5×11, 6×6, 7×6, 6×7, 8×6, 6×8, 9×6, 6×9, 10×6, 6×10, 11×6, 6×11, 7×7, 8×7, 7×8, 9×7, 7×9, 10×7, 7×10, 11×7, 7×11, 8×8, 9×8, 8×9, 10×8, 8×10, 11×8, 8×11, 9×9, 10×9, 9×10, 11×9, 9×11, 10×10, 11×10, 10×11 or 11×11 pixels are produced.

In configurations of the device, which may be combined with all previously described configurations, the control unit may also be designed to use a digital zoom, in particular through interpolation of a number of adjacent physical pixels or virtual pixels which are produced when the binning function is used in order to cover transition areas in the resolution between corresponding binning step levels.

In configurations of the device, which may be combined with all previously described configurations, for the first and second pictures, the control unit may be designed to match active areas of the matrix chip and the binning step levels, and optionally the use of a digital zoom, to one another such that an infinitely variable zoom function is provided.

In configurations of the device, which may be combined with all previously described configurations, the control unit may also be designed to have an optimum ratio based in each case on the active area of the matrix chip and the binning step level used determined as a function of a maximum physical resolution of the matrix chip.

In configurations of the device, which may be combined with all previously described configurations, the material web may have repeats, wherein the control unit may be designed to process corresponding trigger signals which are provided to the device per repeat. In particular, the control unit may be designed to determine the first point in time of the first picture on the basis of a first trigger signal and to determine the second point in time of the second picture on the basis of a second trigger signal so that the first and second portions represent corresponding portions on the material web. The trigger signals may be provided by the control unit, wherein the control unit receives information from the sensor. In particular, the control unit may be provided as an external instrument or may be integrated directly into the camera, In configurations of the device, which may be combined with all previously described configurations, the matrix chip may have a resolution of at least 16 megapixels, at least 32 megapixels, at least 50 megapixels, at least 70 megapixels or at least 100 megapixels.

In configurations of the device, which may be combined with all previously described configurations, the control unit may be designed to have an additional picture of the first portion taken at a third point in time using the first binning step level, wherein a different active area of the matrix chip is used for the additional picture of the first portion than for the first picture of the first portion. The control unit may also be designed to have the third point in time be after the first point in time, in particular wherein the third point in time is before the second point in time or after the second point in time, The device may have first and second lighting devices so that different types of lighting may be used to light the material web for the two pictures of the first portion. The first and/or the second lighting devices may be arranged in traversing fashion in relation to the direction of the material web width x. The control unit may be designed to have an additional picture of the second portion taken at a fourth point in time using the second binning step level, wherein a different active area of the matrix chip is used for the additional picture of the second portion than for the second picture of the second portion. In particular, different types of lighting may be used to light the material web for the two pictures of the second portion. The control unit may be designed to have the fourth point in time after the second point in time or after the third point in time.

In configurations of the device, which may be combined with all previously described configurations, the device may have a multiplicity of cameras, each of which has a matrix chip with a binning function, wherein the control unit is designed to have each of the cameras take pictures corresponding to the preceding embodiments. The cameras may be arranged distributed over the material web width x so that the fields of vision of the cameras in the direction of the material web width x adjoin one another or overlap. The control unit may also be designed to establish a coherent picture from the pictures of the multiplicity of cameras. The control unit may be designed to compensate for mechanical offsets of the cameras with respect to one another in the direction of the material web length y through a corresponding selection of active areas of the matrix chips.

In configurations of the device, which may be combined with all previously described configurations, the device may have a material web position sensor and the control unit may be designed to have the active areas of the matrix sensor determined on the basis of a signal from the material web position sensor, in particular to have a size and/or a position of the active areas in the direction of the material web width x set.

In configurations of the device, which may be combined with all previously described configurations, at least one camera may be provided on a front side of the material web and at least one camera may be provided on a rear side of the material web, wherein the control unit may be designed to have each of the cameras take pictures corresponding to the preceding embodiments.

Further details and features of the invention are described by reference to the following figures.

DETAILED DESCRIPTION

The term "material web" used below is to be interpreted broadly and relates to all types of products which are automatically transported during processing and for which monitoring or inspection is required. This includes, amongst other things, printed paper products, materials and fabrics, packaging and raw materials for packaging, labels, etc. The material webs do not have to be in infinitely continuous form here, but may also be in the than of successive sheets, The device according to the invention and the method according to the invention may be used for monitoring and/or inspecting all of these products.

Figure 1:
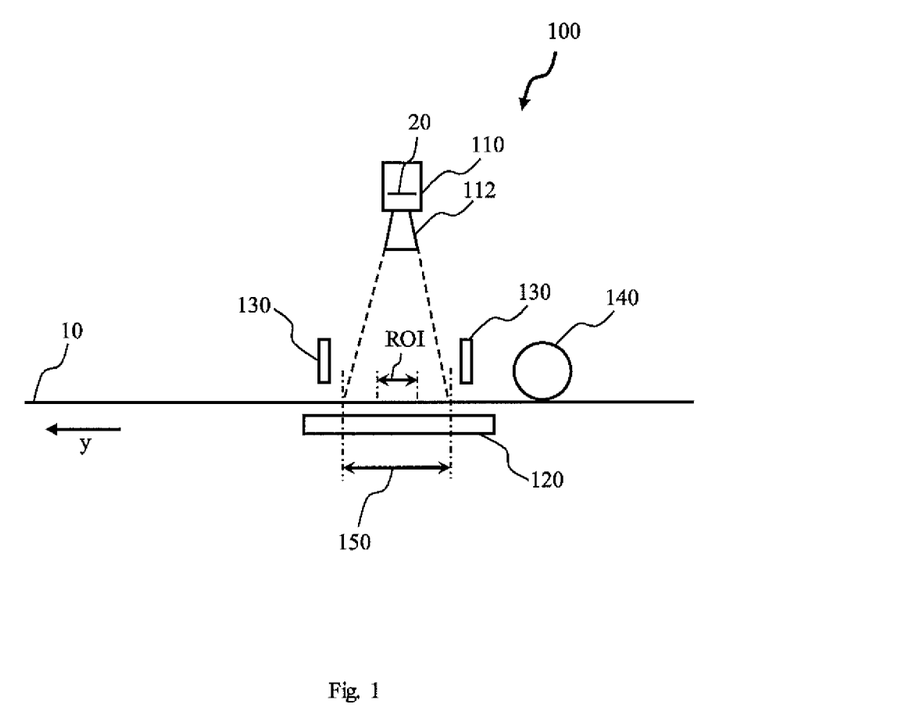
FIG. 1 shows a schematic representation of a device according to the invention for monitoring and/or inspecting a material web according to an exemplary embodiment.

FIG. 1 is a schematic depiction of a side view of a device 100 for monitoring and/or inspecting a material web 10. The device 100 may be used for all of the methods for monitoring and/or inspecting a material web described below, In addition to monitoring/inspecting the web, the device may also be used to measure color density or spectral color. The device 100 comprises a camera 110 which has a matrix chip 20 with a binning function and a "Region of Interest" (ROI) function, for example a CCD or CMOS sensor. The camera 110 may be suitable for 1D, 2D and/or 3D pictures and may be a color or a black-and-white camera. The camera 110 and the field of vision of the camera 110 (or of the cameras when using a camera array, of which more below) may be arranged either in parallel or in traversing fashion with respect to the direction of the material web width (shown corresponding to direction x in FIG. 2 with respect to the correspondingly arranged matrix chip 20). FIG. 1 also shows different devices for lighting the material web 10. In the example shown, one or two lighting devices 130 are provided above the material web 10 and one lighting device 120 is provided below the material web 10. Alternative embodiments may also only have one lighting device or more than two lighting devices, so different types of lighting may be used to light the material web 10 for all of the pictures or picture combinations described below.

FIG. 1 also shows a lens 112 for the camera 110 which preferably has a fixed focal length (fixed-focus lens). In addition, a sensor 140 may be provided which, for example, measures the distance travelled or the current speed of the material web. Encoders, proximity switches, print mark sensors and direct speed sensors, for example, may be used as sensors here, Use may be made, for example, of rotary encoders (incremental rotary encoders or rotary pulse encoders) which are usually used with a wheel. The wheel, having a known rolling circumference, sits on the material web and, for example, one or more pulses are generated per rotation. The distance travelled by the material web in the direction of the material web length y can be determined by the number of pulses counted. The material web speed can then be determined, for example, by reference to the number of pulses counted per unit of time and by reference to the distance travelled, that is to say it can be calculated by reference to the time and distance values. The material web is preferably moved in the direction of a material web length y, but can also be moved in the direction of a material web width x. The material web 10 can, for example, be moved at a web speed of at least 150 m/min, in particular at least 500 m/min, and preferably at least 900 m/min in the direction of the material web length y.

The device 100 also comprises a control unit (not shown in FIG. 1) which controls all of the activities of the device and processes corresponding signals, for example from the sensor 140 or other external sensors. The control unit may comprise a computer unit or part of a computer unit or an examination unit. In addition, one or more monitors may be provided to visually display the pictures taken by the camera or the picture sequences produced (not shown in FIG. 1).

Figure 2:
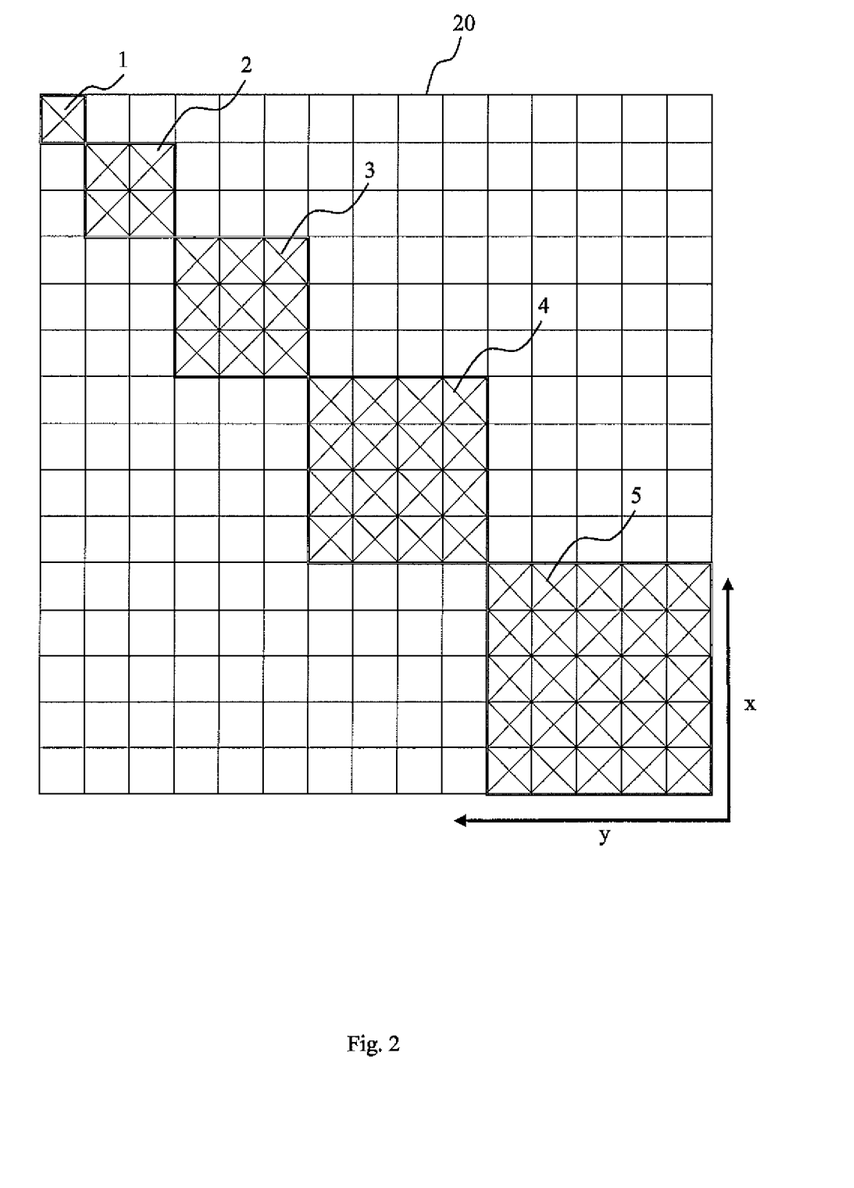
FIG. 2 shows a schematic representation of a matrix sensor to illustrate the binning function.

FIG. 2 is a schematic depiction of a matrix chip 20 and serves to illustrate the binning function of the matrix chip 20. Binning is understood to refer to the grouping of adjacent physical pixels together on the matrix chip 20 itself to form a virtual pixel. By grouping pixels together, it is possible, on the one hand, for example, to achieve a higher light sensitivity per virtual pixel (for example in order to improve the signal-to-noise ratio). On the other hand, however, the picture resolution deteriorates as the number of pixels that are grouped together increases, as a result of which the picture becomes less clear. However, a lower picture resolution has the advantage that the bandwidth when transferring the data for a picture to a subsequent processing system can be reduced. A smaller amount of data per picture also allows the image capture frequency ("frames per second" FPS) to be increased.

FIG. 2 shows examples of five different binning step levels (the total number of pixels of the matrix chip 20 having to be understood purely schematically): going from top left to bottom right, no binning or 1×1 binning 1, 2×2 binning 2, 3×3 binning 3, 4×4 binning 4 and 5×5 binning 5, wherein correspondingly 1, 4, 9, 16 and 25 physical pixels respectively have been grouped together to form a virtual pixel.

When binning step levels of the binning function are used, the physical pixels of the matrix chip 20 in a first direction, in particular in the direction of the material web length y, in a second direction, in particular in the direction of the material web width x, or in combination in the first direction and the second direction, may be grouped together. The binning or the binning step levels can be freely determined so that the matrix sensor 20, for example, can be designed such that, when binning step levels of the binning function are used, the pixels of the matrix chip 20 are grouped together so that virtual pixels having a pixel size of 1×2, 1×3, 1×4, 1×5, 1×6, 1×7, 1×8, 1×9, 1×10, 1×11, 2×1, 3×1, 4×1, 5×1, 6×1, 7×1, 8×1, 9×1, 10×1, 11×1, 2×2, 3×2, 2×3, 4×2, 2×4, 5×2, 2×5, 6×2, 2×6, 7×2, 2×7, 8×2, 2×8, 9×2, 2×9,10×2, 2×10, 11×2, 2×11, 3×3, 4×3, 3×4, 5×3, 3×5, 6×3, 3×6, 7×3, 3×7, 8×3, 3×8, 9×3, 3×9, 10×3, 3×10, 11×3, 3×11, 4×4, 5×4, 4×5, 6×4, 4×6, 7×4, 4×7, 8×4, 4×8, 9×4, 4×9, 10×4, 4×10, 11×4, 4×11, 5×5, 6×5, 5×6, 7×5, 5×7, 8×5, 5×8, 9×5, 5×9, 10×5, 5×10, 11×5, 5×11, 6×6, 7×6, 6×7, 8×6, 6×8, 9×6, 6×9, 10×6, 6×10, 11×6, 6×11, 7×7, 8×7, 7×8, 9×7, 7×9, 10×7, 7×10, 11×7, 7×11, 8×8, 9×8, 8×9, 10×8, 8×10, 11×8, 8×11, 9×9, 10×9, 9×10, 11×9, 9×11, 10×10, 11×10, 10×11 or 11×11 pixels are produced. This list of examples is not supposed to be exhaustive. Ultimately, the distribution/number of pixels grouped together can be freely specified depending on the application and the maximum physical resolution of the matrix chip 20 used and is limited only by the physical resolution of the matrix chip 20 used. This can be seen, in particular, with respect to the rapid development in the area of matrix sensors and the possible data transfer rates, so the methods and devices described herein are by no means to be viewed as being limited to the matrix sensors/data transfer rates currently available.

The method according to the invention uses the binning function of the matrix chip 20 in a new way and allows a physical zoom function without any further complex instruments such as additional movable cameras or zoom lenses. This is made possible by adopting the following approach: taking a first picture of a first portion of a material web 10 at a first point in time with a camera 110 (which has a matrix chip 20 with a binning function), and taking a second picture of a second portion of the material web 10 at a second point in time with the camera 110. A first binning step level is used for the first picture, in each case a first number of pixels of the matrix chip 20 being grouped together using the binning function, and a second binning step level being used for the second picture, in each case a second number of pixels of the matrix chip 20 being grouped together using the binning function. The first number of pixels which are in each case grouped together is higher or lower than the second number of pixels which are in each case grouped together, as a result of which a physical zoom function is achieved for the second picture.

Figure 3A:
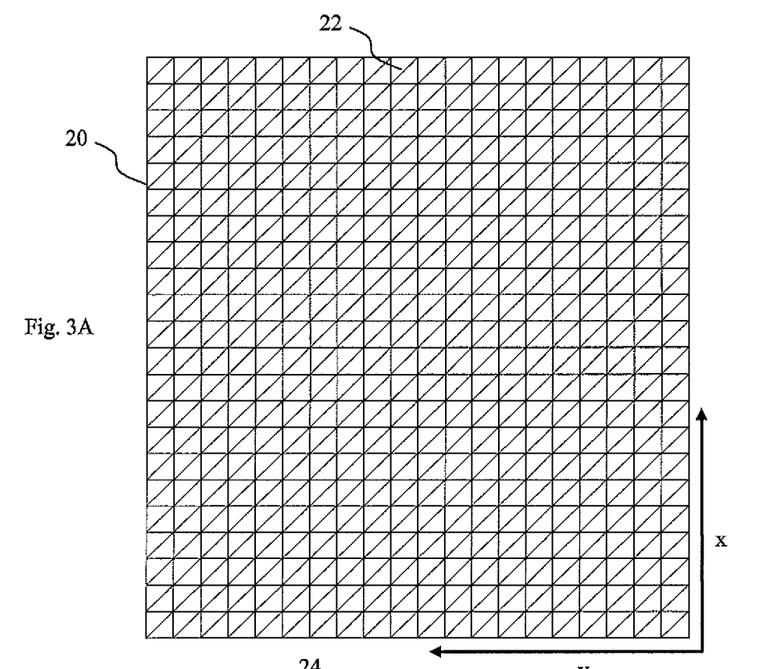
FIG. 3A and FIG. 3B show two schematic representations of a matrix chip with correspondingly activated areas, for example when being used for web monitoring.
Figure 3B:
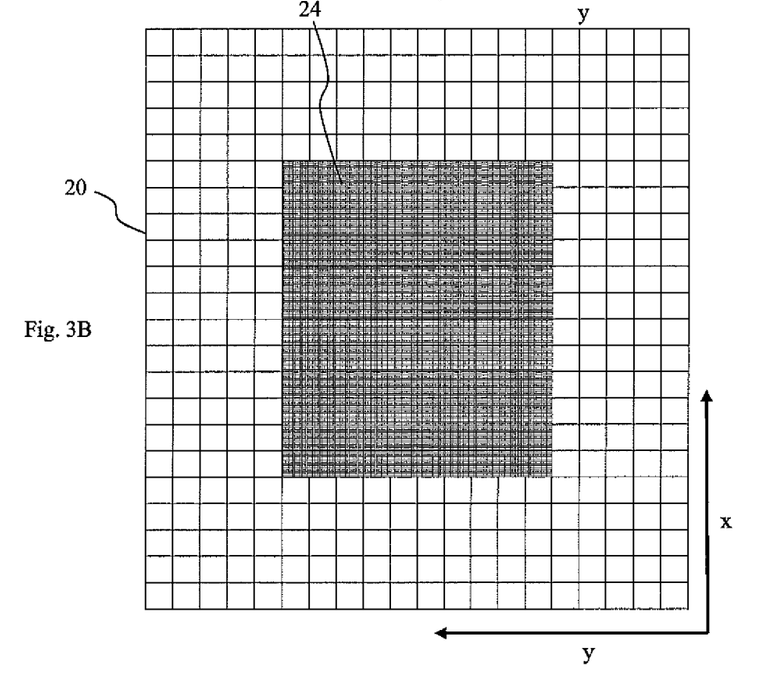

The method according to the invention can be used in different applications. A first example is web monitoring in which pictures are continually monitored with a resolution that remains as constant as possible over the zoom levels. The zoom level used may, for example, be fixed or may be set in accordance with an input by a user. This means that a user can prescribe the zoom level to be selected for taking the pictures. Examples hereof are shown in FIG. 3A and 3B. FIG. 3A shows a time of a picture in which the entire field of view (first active area 22) of the matrix chip 20 is used with a first binning step level, for example in order to capture a first portion of a material web. If a zoom picture is now supposed to be taken, a reduced field of vision is captured (with a second, smaller active area 24 of the matrix chip 20). For this field of vision, a lower binning step level with a picture resolution remaining as constant as possible is selected for the reduced field of vision (with respect to the original field of vision), which also means a larger number of pixels per mm for the reduced field of vision. This is shown in schematic form in FIG. 3B. it is not always necessary for two successive pictures to have a different binning step level here. It may be the case that a large number of pictures are taken at the first binning step level and the user only takes a second picture at the second binning step level in certain circumstances, for example because he has discovered an error. After pictures have been taken "zoomed in", it is also possible for the user to "zoom out" again so that he can get a larger field of view of the matrix chip 20 and therefore monitor a larger portion of the material web.

The material web 10 may, for example, have repeats, wherein, for example when monitoring the web per repeat, a corresponding trigger signal is provided so that the first point in time of the first picture can be determined by a first trigger signal and the second point in time of the second picture can be determined by a second trigger signal. It is thereby possible for the first and second portions to represent corresponding portions and not identical portions on the material web 10. On the other hand, it is also possible, when monitoring the web, for the x and y coordinates to be set by the user so that the portions do not, or do not completely, represent corresponding portions of the material web 10. For the triggering, use may be made, for example, of the abovementioned control unit or a control device which, for this purpose, receives information from the sensor 140 in order to send a trigger signal for the first pictures and the second pictures to the camera 110. The control unit or the control device may be provided as an external instrument. However, it is also possible for such a device or control logic to be installed directly in the camera 110. Therefore, the sensor 140 may, for example, be connected directly to the control device or to the camera 110.

A second example of an application for the device and method according to the invention is inspection. Here, for example if errors have been detected on the material web, second pictures are automatically taken at the second binning step level in order to be able to inspect the error more closely.

For special types of this application, for example in the case of multi-inspection (inspection with multiple types of lighting, of which more below), the first portion and the second portion may be two identical material web portions or the second portion may be a subsidiary portion of the first portion.

As shown in FIG. 3A to FIG. 5b, for the first picture, a first active area 22 of the matrix chip 20 may be used in order to cover a first field of vision and, for the second picture, a second active area 24 of the matrix chip 20 may be used in order to cover a second field of vision. In particular, the first active area 22 and correspondingly the first field of vision may be larger than the second active area 24 and correspondingly the second field of vision. This can be seen, for example, in FIGS. 3A and 3B and FIGS. 5A and 5B. Alternatively, the second active area 24 may be as large as the first active area 22 (see FIGS. 4A and 4B). In particular, the second active area 24 may be part of the first active area 22, in particular lie within the first active area 22 (see FIGS. 3A and 3B). An advantage of this method, for example, is the reduction in the amount of data and the computer power required to use the binning function and a "Region of Interest" (ROI) function, because only the resolution required in each case or the field of vision required in each case is requested or captured and processed. A lower data load in turn also allows the image capture frequency (FPS) to be increased.

The fields of vision of the camera 110 or of the matrix chip 20 may, for example, have a length and a width which are arranged according to the direction of the material web length y and the direction of the material web width x (directions x and y can be seen in FIGS. 2 to 6C). When the field of vision is adjusted, the length and/or the width of the field of vision is changed. As already mentioned, the principle of a "Region of Interest" (ROI) is applied here, this principle exploiting the fact that it is possible, in matrix chips 20, to activate only specific areas 22, 24 of the sensor: for the first picture, for example, the entire field of view of the matrix sensor 20 (see FIG. 3A) or a large part of the field of view may be used. For this part, a first binning step level is used which in each case groups together a relatively large number of physical pixels to form a virtual pixel. In order to allow a zoom function for the second picture, a correspondingly selected second area 24 of the matrix chip 20 (see FIG. 3B) may be used in order to cover a second (smaller) field of vision (an ROI is selected). For this part, a second binning step level is used which in each case groups together a relatively small number of physical pixels to form a virtual pixel or binning is completely dispensed with (1×1 binning step level). Alternatively, the field of view may also be equally large for both pictures (see, for example, FIGS. 4A and 4B). For the second picture (and in the correspondingly active area of the matrix sensor 20), a second binning step level is selected in which, compared to the first binning step level for the first picture, in each case only a smaller number of physical pixels are grouped together or no binning whatsoever is used. The second picture would thereby have a higher picture resolution (number of pixels per mm) with an equally large field of view, as a result of which the second picture would be displayed more precisely or, for example, a better physical resolution could also be enabled for a digital zoom function.

In the case of pictures with differently sized fields of vision, it is also possible, for example, to keep the number of "binned" virtual pixels or physical pixels as far as possible the same both for the first picture with the relatively larger field of vision and for the second picture with the smaller field of vision. These functions allow a zoom lens to be replaced and nevertheless provide corresponding zoom levels with the same resolution. An attempt is therefore made to keep the resolution of the used active areas of the matrix chip 20 constant over the binning step levels when the field of vision is changed. The zoom level changes here according to the field of vision used and/or the binning step levels used.

It is also possible to dispense with a camera and a lens following a corresponding selection of the matrix chip 20 and, for example, the additional use of a digital zoom function in systems with two cameras and two lenses (for example a wide angle lens and a telephoto lens, what are referred to as dual view camera systems) (an example of this is given below).

As can be seen in FIG. 3A and FIG. 3B, which show an application of the method for web monitoring, a correspondingly smaller 24 or larger area 22 is actually activated here, in the same ratio in the x and y directions from outside to inside (or from inside to outside), depending on which zoom level is supposed to be exchanged with which zoom level. The drawings in the figures are to be understood here to be examples only. The maximum possible active field of vision (150 in they direction, see FIG. 1 or FIG. 3A with respect to the matrix chip surface in the x and y directions) of the matrix chip 20 is usually fully exploited in web monitoring and is only restricted when zooming in on an area 24.

The possible zoom levels can also be described as follows: the more physical pixels that have been grouped together for the first picture to form a virtual pixel, the more physical zoom levels there are available for the second picture in which, at a lower binning step level, fewer physical pixels are grouped together to form a virtual pixel or the binning function is no longer used and the maximum physical resolution of the matrix chip 20 is used. Consequently, the result equates to an optical zoom because there is no need for algorithmic extrapolation like, for example, in a digital zoom, and instead the information is obtained physically. If the binning function is no longer used or the maximum physical resolution of the matrix chip 20 is used, there may of course still be a further digital zoom function, but with the known disadvantages resulting from the digital zoom function.

Further advantages are, for example, the reduction in the amount of data and the computer power required to use the binning function and an ROI function, because only the resolution required in each case or the field of vision required in each case is requested or captured and processed. A lower data load in turn also allows the image capture frequency (FPS) to be increased.

The principle according to the invention applied to web monitoring is to be explained below in comparison with known methods/devices by reference to two numerical examples. In a first example, a conventional device for web monitoring with a zoom lens and a matrix sensor has, for example, the following specifications:

Zoom lens (12×)
Resolution of the sensor used 1024×768
Field of vision max. ca. 100 mm×71 mm
Field of vision min. ca. 9 mm×7 mm The resolution of the sensor of 1024×768 pixels remains constant over range of the optical zoom. In the maximum field of vision (ca. 100 mm×71 mm), the picture resolution is 0.098 mm/pixel, in the minimum field of vision (ca. 9 mm×7 mm) the picture resolution is 0.009 mm/pixel. The zoom lens even provides a better picture resolution in mm/pixel in the minimum field of vision through the constant resolution of 1024×768 pixels.

According to the invention, the zoom lens is to be dispensed with, but the requirement that the quality of the pictures be maintained in relation to the respective fields of vision is still supposed to be met. This could be achieved, according to the invention, for example, with a 100 megapixel matrix chip (resolution, for example, 11548×8661). In the case of a binning step level with 11×11 binning and a corresponding maximum field of vision of ca. 100 mm×71 mm, this gives a picture resolution of ca. 0.095 mm/virtual pixel. If a picture is supposed to be taken corresponding to zoom level 12 of the 12× zoom lens, the binning function can be dispensed with (corresponds to the 1×1 binning step level) and the field of view can be limited to ca. 9 mm×7 mm. A picture resolution of ca. 0.009 mm/pixel is then achieved for this area. As this shows, with a 100 megapixel sensor, a possible physical resolution of zoom level 1 to zoom level 12 of the device specified by way of example above can be maintained with respect to the resolution values with a 12× zoom lens. The result therefore equates to an optical zoom because there is no need for algorithmic extrapolation like in a digital zoom, and instead the information is obtained physically.

In a second example, a device with two cameras and two lenses (what is referred to as a dual view camera system), for example, has the following specifications:

Fixed lenses (digital zoom with a wide angle and a telephoto lens)
Resolution 2596×1944 (2× matrix sensor)
Field of vision max. ca. 120 mm×90 mm (wide angle lens)
Field of vision max. ca. 32 mm×24 mm (telephoto lens)
Field of vision min, ca. 4 mm×3 mm (telephoto lens)

The picture resolution is ca. 0.046 mm/pixel in the field of vision of the wide angle lens of ca. 120 mm×90 mm to ca. 32 mm×24 mm, However, the picture resolution is achieved only for the field of vision through the sensor with a wide angle lens (first camera). Digital zooming is carried out here to a field of vision of, for example, 32 mm×24 mm. A switch is then made to the sensor with a telephoto lens (second camera). A picture resolution of 0.012 mm/pixel is achieved here for the field of vision of the telephoto lens of ca. 32 mm×24 mm to ca. 4 mm×3 mm. Up to a field of vision of ca. min 4 mm×3 mm, digital zooming is carried out again. This means that the resolution in the respective field of vision is not kept constant as in a web monitoring system with a zoom lens.

By applying the principle underlying the invention, a camera and a lens are to be dispensed with here, but the requirement that the quality of the pictures be maintained in relation to the respective fields of vision is still supposed to be met. This could be achieved, according to the invention, for example, with a 70 megapixel matrix chip (resolution, for example, 9735×7920). The matrix chip is binned for the maximum field of vision of 120 mm×90 mm at binning step level 4×4 so that a physical resolution or virtual resolution (by grouping together physical pixels at binning step level 4×4) of ca. 2434×1823 pixels is produced, this corresponding to ca. 0.049 mm/virtual pixels. It would in theory by possible to zoom in to the field of vision of 32 mm×24 mm digitally from here. From this field of vision, the binning step level would be set to 1×1 or binning would be completely dispensed with. For this area, the matrix chip then has a resolution of 2596×1944 pixels equivalent to the sensor of the second camera with a telephoto lens of the known system, which corresponds to ca. 0.012 mm/pixel. From here, digital zooming would again be used to the field of vision of min. 4 mm×3 mm. The picture resolution in mm/pixel in the field of vision 120 mm×90 mm to 32 mm×24 min would then also still be 0.049 mm/pixel and from 32×24 mm to 4 mm×3 mm also still 0.012 mm/pixel because the resolution also reduces as the field of vision gets smaller. In addition, the unused binning step levels 3×3 and 2×2 could still be used from a certain field of vision in order to get better physical resolution values sooner.

In the case of web monitoring, provision may also be made for the first picture to be displayed for a user, for example on a monitor, and for the second picture to be taken in response to a user input and then displayed, for example, for the user also on the monitor. The second binning step level and optionally the second field of vision can be selected here as a function of the user input. If a digital zoom is used, this can also be selected as a function of the user input. This means that the number of pixels that are grouped together at the second binning step level (more or less than at the first binning step level for the first picture) and the position and size of the field of vision (ROI) can be controlled by the user.

Figure 4A:
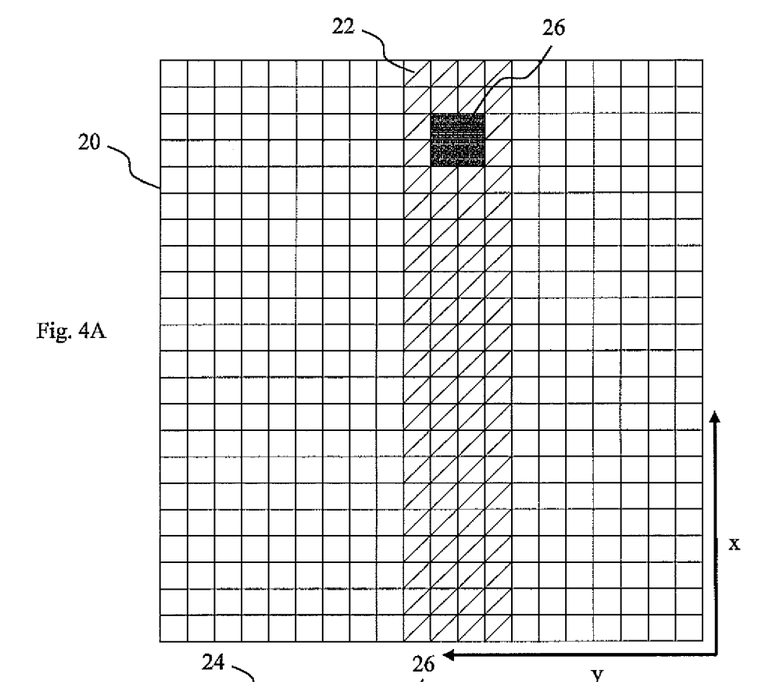
FIG. 4A and FIG. 4B show two schematic representations of a matrix chip with correspondingly activated areas, for example when being used for inspection.
Figure 4B:
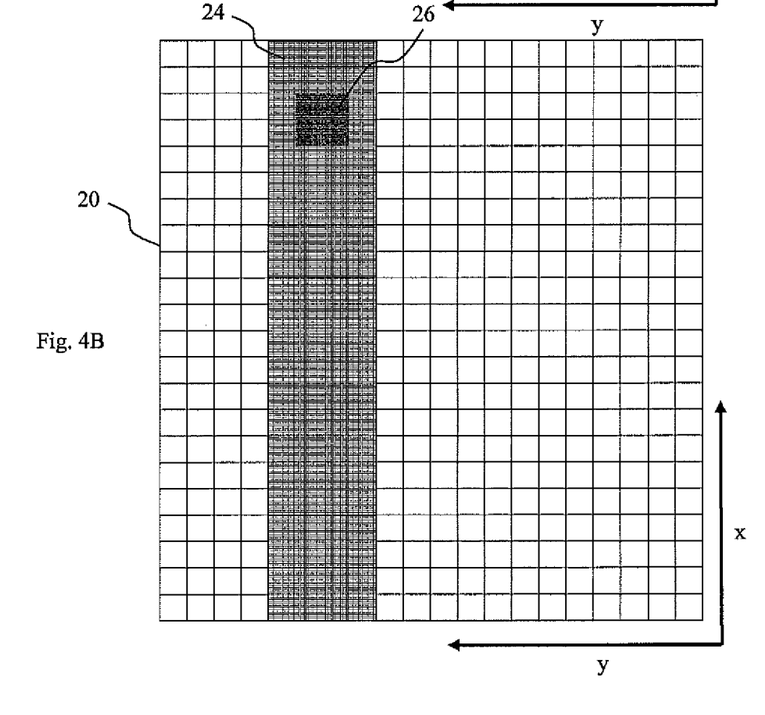
Figure 5A:
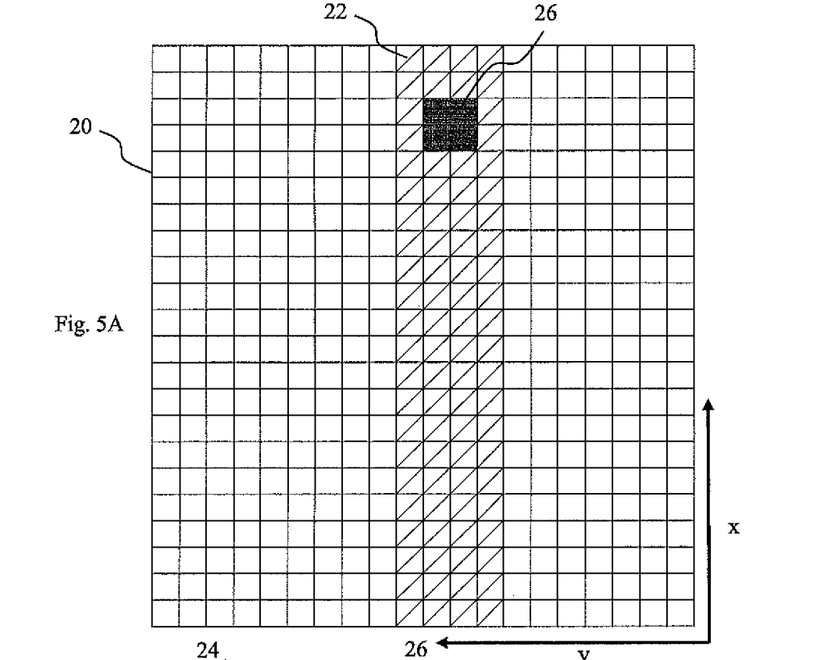
FIG. 5A and FIG. 5B show two further schematic representations of a matrix chip with correspondingly activated areas, for example when being used for inspection.
Figure 5B:
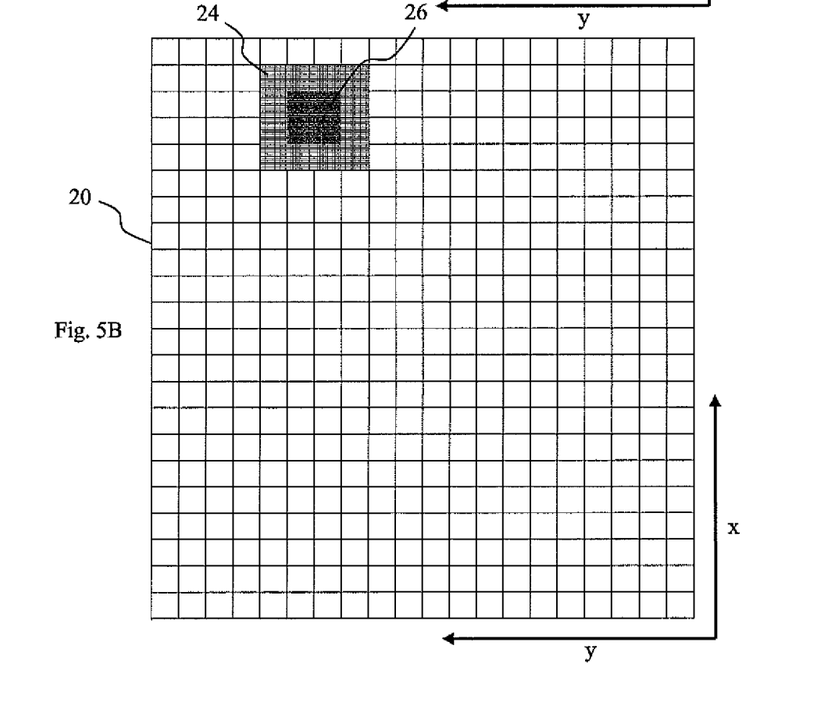

If the method or the device 100 is used for inspecting the material web 10, the first active area 22 and the second active area 24 of the matrix chip 20 are not identical and may or may not overlap. A number of trigger signals are also emitted per repeat because the material web 10 is being fully inspected. The method then comprises evaluating the first picture and determining a position of at least one error 26 on the material web 10. The second binning step level and/or the second active area 24 can then be determined on the basis of the position of the error 26. FIGS. 4A and 4B show an example with a first active area 22 in which the error 26 has been recognized (see FIG. 4A). FIG. 4B shows the matrix chip 20 for the second picture at the second point in time in which the material web has run a little further in the y direction. The second active area 24 is now used here at a lower binning step level and therefore with larger resolution in order to be able to capture or display and inspect the error 26 more accurately. The method is particularly advantageous when carrying out inspection if not only the binning step level for the second active area 24 is changed, as shown in FIG. 4A and FIG. 4B, but the field of can also be restricted to the position of the error in the x and y directions. This is schematically depicted in FIGS. 5A and 5B. It is then possible, for example, to reduce the binning step level still further and therefore to achieve a higher resolution for the zoom function without increasing the amount of data in the picture. In other words, the binning function is dispensed with at least for an area of the matrix chip 20 or the binning step level is reduced and the ROI is optionally selected, through selection of the second active area 24, so that a field of vision of the camera for the second picture is produced which allows a subsequent second picture of the error 26 (or a number of pictures of the error 26a, 26b, see FIGS. 6A to 6C) with a higher resolution which can then, for example, be filed or displayed for a user. This is to be illustrated once again by reference to a numerical example of binning when inspecting a material web: When using, for example, a 16 megapixel sensor (4920×3264), a range of vision of 330 mm a 3×3 binning, this gives a picture resolution in the direction of the range of vision for the "binned" full inspection of (330/4920)*3=0.2012 mm/virtual pixel. With the zoom function for the second picture without binning, which can be applied over some or all of the matrix chip, this then gives the three-fold picture resolution, that is to say 0.067 mm/pixel.

In addition, the second picture may also be taken at the second point in time on the basis of the position of the error 26. The position of the error 26 may, for example, be given in coordinates relating to the direction of the material web length y and the direction of the material web width x. The second point in time for the second picture can then be determined on the basis of these coordinates and the web speed of the material web 10 (measured by the sensor 140, for example). The second active area 24 can also be determined as a function of a material web speed. For the second active area 24, the position thereof in the direction of the material web length y, in the direction of the material web width x and/or a variable based on the position of the error 26 and the size of the error 26 can be determined. This is advantageous because the second picture concentrates specifically on the error area. As a result, the data load can be further reduced and the resolution increased because only a small area of the matrix chip 20 with a reduced binning function or with the binning function dispensed with has to be activated. This means that the first and the second active areas 24 and the adjustment of the binning step level (or the dispensing with binning altogether) can be variably adjusted. In addition to taking pictures for full inspection and taking pictures of one error for visual display, pictures can also be taken for web monitoring.

The principle according to the invention may also be used, for example, for variable error classification in which it is also possible to set the error size to be recognized in ongoing operation downward (or upward). The aim here is for the approximate minimum error size which can be inspected or recognized at all actually to be predefined in inspection systems. If even smaller errors are supposed to be recognized, then the resolution for the first active area 22 could be increased (if the hardware so allows) so that even smaller errors can be recognized, these then being captured in the second active area 24 by means of the second picture with an even higher resolution. This is of course also possible in the other direction: if certain error sizes are tolerable, the resolution can then also be lowered for the first active area 22. It is therefore possible to set the error size from which errors are recognizable directly via the resolution used for the first active area 22. If an error is recognized, this is then captured in the second active area 24 by means of the second picture with a higher resolution.

The device may also comprise a material web position sensor which determines, for example, a position or a width of the material web (in the x direction). The signals of the position sensor can be provided to the control unit so that the active areas 22, 24 of the matrix sensor are determined on the basis thereof, in particular a size and/or a position of the active areas 22, 24 in the direction of the material web width x are set.

Using the method described herein and the device 100 described herein, it goes without saying that the positions of a multiplicity of errors 26a, 26b can also be determined and a corresponding multiplicity of second pictures can be taken. If the two or more errors 26a, 26b are in the same position in the direction of the material web length y, then these two or more errors 26a, 26b can also be captured at the same time in a second picture with the correspondingly higher resolution.

Figure 6A:
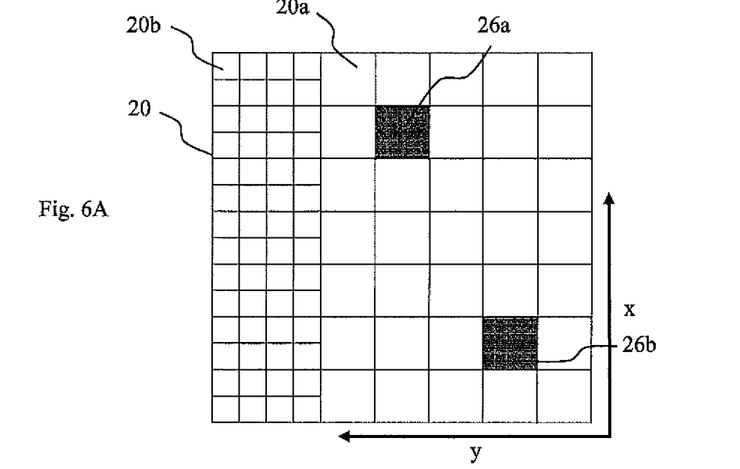
FIG. 6A to FIG. 6C show three further schematic representations of a matrix chip with correspondingly activated areas, for example when being used for inspection.
Figure 6B:
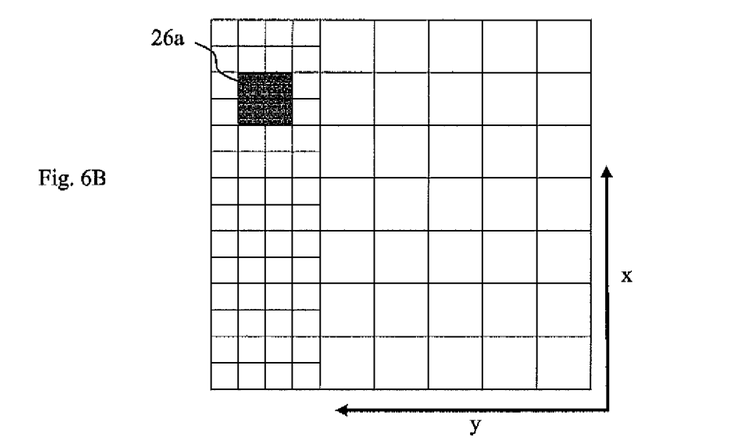
Figure 6C:
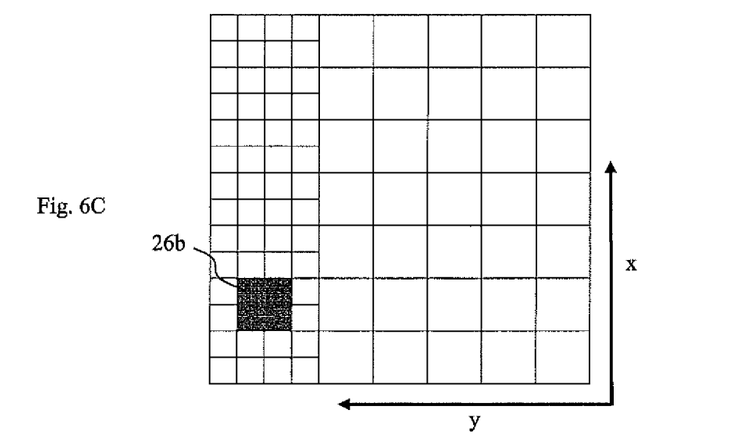

In the example shown in FIGS. 6A to 6C, the matrix chip 20 is divided into first and second parts 20a, 20b, wherein the first part 20a operates at the first binning step level and is used for the first picture and the second part 20b operates at the second binning step level and is used for the second picture. The second part 20b lies here behind the first part 20a in the direction of movement of the material web. Provision may then be made, for example, for the second part 20b only to be activated if an error 26a, 26b has been found in the first picture. The first part 20a may be larger than the second part 20b. The first part 20a may, for example, be at least twice as large, at least three times as large, at least five times as large, or at least nine times as large as the second part 20b. The first part 20a may, for example, take up about 90% of the matrix chip 20 and the second part 20b may, for example, take up about 10% of the matrix chip 20. It may also be advantageous for the second part 20b to increase the camera parameter referred to as the "gain" in order to compensate for a poorer light yield in this less binned state or to reduce image noise. This of course also applies to all of the other examples of use of the method according to the invention described herein. The camera parameter referred to as the "gain" can be increased or set to a certain binning step level in order to compensate for any poorer light yield.

In this division of the matrix chip 20, first pictures may continually be taken with the first part 20a and second pictures may continually be taken with the second part 20b. In particular, the second pictures may continually be saved in a ring memory. Corresponding second pictures may be read from the ring memory and/or provided and/or displayed, for example on a monitor, for a user if at least one error 26a, 26b has been found in corresponding first pictures. Both the first pictures and the second pictures may cover the whole of the material web 10. In order to cover the whole of the material web 10, the number of second pictures has to be adjusted according to the size ratios of the first and second parts 20a, 20b. If the first part 20a, as described above, for example, takes up 90% of the matrix chip 20 and the second part 20b takes up 10% of the matrix chip 20, then, for each first picture with the first part 20a, a total of nine second pictures have to be taken with the second part 20b. In other words, the second part 20b has to be triggered nine times for nine pictures while the first part 20a only has to be triggered once. As a result, through multiple triggering of the second part 20b, a sequence of pictures at a lower binning step level or without the use of binning (which is equivalent to a higher physical resolution) are taken which also covers the whole of the material web 10. If, for example, the first part 20a has a binning step level of 9×9 and the second part 20b has a binning step level of 1×1 (that is to say virtually no binning is applied), this approach is advantageous because the individual data packets (of the first and second pictures) always contain an equivalent amount of data which can be matched to an available bandwidth. The available bandwidth is then not exceeded at any time. For the purposes of interpretation, it is only necessary to ensure that a suitable ratio of parameters (size ratio of the first part 20a to the second part 20b of the matrix chip 20 and the binning step level used for the respective parts) is found and that this is matched to the available bandwidth. In the example shown in FIGS. 6A to 6B, FIG. 6A shows a picture of the first part 20a in which two errors 26a, 26b have been recognized. FIG. 6B shows a picture with the second part 20b at a point in time at which the first error 26a is in the field of vision of the second part 20b. FIG. 6C shows a further picture with the second part 20b at a later point in time at which the second error 26b is in the field of vision of the second part 20b.

A further advantage of this method and of this device 100 is therefore that it is also possible to display one-off errors in high resolution and they do not necessarily have to be repeated errors. In other words, when inspecting a material web, it is possible, after an error has been detected and recognized, to adjust the ROI (in the y direction and optionally also in the x direction) and the binning step level and to capture the same error in high resolution again.

In configurations of the method and of the device 100, provision may also be made for additionally using a digital zoom function, in particular, for example, through interpolation of a number of adjacent physical pixels or virtual pixels which are produced when using the binning function. Through the digital zoom function, for example, transition areas can be covered in the resolution between corresponding binning step levels. This is advantageous in the method described herein because the physical resolution can be repeatedly adjusted through the binning step levels so that any deterioration through the use of the digital zoom is barely noticeable. In other words, before a picture looks blurred or pixelated as a result of excessive digital zoom and corresponding interpolation (e.g. when displayed on a monitor), the next binning step level which provides a higher physical resolution again can be used. As already mentioned above, the digital zoom function can also still be used after the binning step levels have been completely dispensed with, that is to say the physical zoom function has been exhausted.

As already described, the selection of the binning step levels and of the areas to be activated (for example according to an ROI) can be determined relatively freely. As a result, in addition to a stepped zoom function, for the first and second pictures, it is possible for the active areas 22, 24 of the matrix chip 20 and the binning step levels, and optionally the use of a digital zoom, to be matched to one another such that an infinitely variable zoom function is provided, On the other hand, when using the method with a stepped zoom function, it is possible for the selected fields of vision and the binning step levels to be adapted to one another so that, for example, each field of vision has the same resolution (with respect to the total number of (virtual) pixels per field of vision). As a result, the size of the data packets sent per picture remains the same in each case.

Accordingly, the binning step levels can also be adjusted so that the resolution in a constant field of vision is reduced in order, for example, to increase the image capture frequency (FPS). If, for example, a resolution of 2048×1024 is used, then 56 FPS can be sent to the control unit via a Single Gigabit Ethernet Interface. If, instead, the resolution of 2048×512 is used (for example by 1×2 binning or by restricting the field of vision), then 112 FPS can be sent to the control unit via the Single Gigabit Ethernet Interface. The FPS and the field of vision then ultimately determine the maximum possible web speed for a full inspection of the material web 10.

According to the application, the respective active areas 22, 24 and thereby the respective field of vision and the binning step level to be used may therefore be optimally matched to one another as a function of a maximum physical resolution of the matrix chip 20, the web speed and the properties of a lens 112 optionally used for the pictures, The properties of the optionally used lens can of course also be adjusted as a function of the maximum physical resolution of the matrix chip 20. The matrix chip 20 may, for example, have a resolution of at least 16 megapixels, at least 32 megapixels, at least 50 megapixels, at least 70 megapixels or at least 100 megapixels. There is no apparent upper limit here on account, in particular, of the rapid development in this area.

As already mentioned above, the methods and devices described herein may also be used for multi-inspection of the material web 10. An additional picture of the first portion is taken here at a third point in time using the first binning step level, wherein a different active area of the matrix chip 20 is used for the additional picture of the first portion than for the first picture of the first portion, The third point in time is after the first point in time. In particular, depending on the application, the third point in time is before the second point in time or after the second point in time, Different types of lighting are used to light the material web 10 for the two pictures of the first portion so that two different sequences of pictures (with two different types of lighting) can be taken of the full material web 10. For example, lighting may be provided once with lighting device 120 and once with lighting device 130, An additional picture of the second portion is then also taken at a fourth point in time using the second binning step level, wherein a different active area of the matrix chip 20 is used for the additional picture of the second portion than for the first picture of the second portion. The fourth point in time is after the second or after the third point in time. The same type of lighting may be used for the additional picture of the second portion as for the additional picture of the first portion, in particular a different type of lighting than for the second picture of the second portion. This would then mean overall, for example, continually taking in each case a picture with first lighting and low resolution, first lighting and high resolution, second lighting and low resolution and second lighting and high resolution. Different types of lighting can therefore be used to light the material web 10 for the pictures of the first portion and of the second portion and for the additional pictures of the first portion and of the second portion.

The multi-inspection is not limited to in each case two pictures per portion with two types of lighting. In addition to multi-inspection with two sequences of pictures, the device may also be used for multi-inspection with three or more sequences of pictures. To do this, further pictures of the corresponding portions are then taken at corresponding further points in time using corresponding further active areas of the matrix chip 20. Further types of lighting may be used to light the material web 10 for these further pictures. Further lighting devices can of course be provided in addition to the lighting devices 120, 130 shown. The types of lighting may, for example, be selected from among incident lighting, background lighting and transmitted light lighting. A series of lighting properties may be provided here: homogeneous or inhomogeneous lighting, direct, diffuse, focused or collimated lighting, coaxial, transmissive and/or polarized lighting, different lighting angles and light field or dark field lighting, light wavelengths in the UV, visible or IR range (in order, for example, to be able to inspect security features too), single-colored (monochrome), multicolored (polychrome) or color matchable or controllable (RGB) lighting, surface lighting or line lighting, and constant or flash lighting. In the case of incident lighting and transmitted light lighting, these can be used alternately or at the same time. The lighting devices may be configured as a tunnel lighting system, a tube lighting system or a dome lighting system, and may be adjusted modularly or to the material web width, Light bulbs, glow-discharge lamps, LED lighting, OLED lighting or laser lighting, for example, may be used as means of lighting. The respective types of lighting and properties may be used, for example, for the following multi-inspection: Printed image inspection with visible incident light, label inspection with visible transmitted light and inspection of UV security features with UV incident light.

In summary, the method described herein and the device 100 offer the following functionalities:

Taking pictures for full inspection with first lighting

Taking pictures for full inspection with second lighting

Taking pictures of errors in high resolution for visual display (sporadically) with first lighting Taking pictures of errors in high resolution for visual display (sporadically) with second lighting Taking pictures for web monitoring with first lighting Taking pictures for web monitoring with second lighting Pictures for web monitoring may be taken here, for example, with the sequence of pictures for full inspection or the picture for full inspection may be output as a picture for web monitoring, The picture that is output then corresponds to the resolution which was used for the inspection, If an extra picture is taken for web monitoring with the first and/or second lighting, the field of vision and the picture resolution may be correspondingly adjusted again and physical zooming can therefore be used.

The device may also have a multiplicity of cameras 110 which each have a matrix chip with a binning function and an ROI function, wherein each of the cameras takes corresponding pictures for the methods of web monitoring and/or inspecting described above. The cameras may be arranged distributed over the material web width x so that the fields of vision of the cameras in the direction of the material web width x adjoin one another or overlap. A coherent picture may be established from the pictures of the multiplicity of cameras 110. Mechanical offsets of the cameras with respect to one another in the direction of the material web length y can also be compensated for through a corresponding selection of active areas of the matrix chips 20. The camera array may therefore capture an identically positioned portion of the material web passing through in the direction of the material web length y.

In addition to one or more cameras on the front side of the material web 10, at least one camera 110 may also be provided on the front side of the material web 10 and at least one camera may be provided on a rear side of the material web 10, wherein again each of the cameras can take corresponding pictures for the methods of web monitoring and/or inspection described above. This allows both sides of the material web to be monitored or inspected.

Depending on the focal length of the lens 112 used and as a function of the ROIs used on the matrix chip 20, different geometrical distortions of the picture taken and therefore inaccuracies may arise. These may, for example, be compensated for by distortion calibration. Provision may also be made for distortion correction which is dynamically adjusted to a respective ROI.

Although the present invention has been described above and is defined in the attached claims, it should be understood that the invention may alternatively also be defined according to the following embodiments:

We claim:

1. A method for monitoring and/or inspecting material webs which are moving in the direction of a material web length (y) and/or a material web width (x), wherein the method comprises the following steps:

taking a first picture of a first portion of a material web at a first point in time with a camera (110) which comprises a matrix chip with a binning function; and taking a second picture of a second portion of the material web (10) at a second point in time with the camera;

wherein the first portion and the second portion are selected from the group of material web portions consisting of two identical material web portions and two corresponding material web portions, or wherein the second material web portion is selected from the group of web portions consisting of a subsidiary portion of the first portion of the web material (10) and a corresponding subsidiary portion of the first portion of the material web (10); and further wherein for the first picture, a first binning step level is used in which each case a first number of pixels of the matrix chip are grouped together using the binning function and, for the second picture, a second binning step level is used in which in each case a second number of pixels of the matrix chip are grouped together using the binning function, and in that the first number of pixels which are in each case grouped together is higher than the second number of pixels which are in each case grouped together, as a result of which a physical zoom function is achieved for the second picture; and wherein for the first picture, a first active area (22) of the matrix chip (20) is used in order to cover a first field of vision and, for the second picture, a second active area (24) of the matrix chip (20) is used in order to cover a second field of vision, wherein the first active area (22) and correspondingly the first field of vision are at least equally as large as the second active area (24) and correspondingly the second field of vision; and wherein the first active area and the second active area are not identical.

2. The method according to claim 1, wherein the second active area is part of the first active area and optionally wherein the second active area is arranged within the first active area.

3. The method according to claim 1, characterized in that the method also comprises the following steps:

displaying the first picture for a user;

taking the second picture in response to a user input, and displaying the second picture for the user; wherein the second binning step level and optionally the second field of vision are selected as a function of the user input.

4. The method according to claim 1, wherein the first area and the second area overlap or do not overlap, and wherein the method also comprises the following steps:
- evaluating the first picture and determining a position of at least one error on the material web; and
- selecting the second binning step level and/or the second active area on the basis of the position of the error on the material web.

5. The method according to claim 4, the second picture is taken at the second point in time on the basis of the position of the error.

6. The method according to claim 4, the positions of a multiplicity of errors are determined and a corresponding multiplicity of second pictures is taken.

7. The method according to claim 1, the matrix chip is divided into first and second parts, wherein the first part operates at the first binning step level and is used for the first picture and the second part operates at the second binning step level and is used for the second picture, in particular wherein the second part lies behind the first part in the direction of movement of the material web.

8. The method according to claim 7, the second part is only activated if an error has been found in the first picture.

9. The method according to claim 7, first pictures are continually taken with the first part and second pictures are continually taken with the second part, wherein the second pictures are continually saved in a ring memory and optionally wherein corresponding section pictures are read from the ring memory and/or provided and/or displayed for a user if at least one error has been found in corresponding first pictures.

10. The method according to claim 1, a digital zoom is also used, in particular through interpolation of a number of adjacent physical pixels or virtual pixels which are produced when the binning function is used in order to cover transition areas in the resolution between corresponding binning step levels.

11. The method according to claim 1 for the first and second pictures, active areas of the matrix chip and the binning step levels, and optionally the use of a digital zoom, are matched to one another such that an infinitely variable zoom function is provided.

12. The method according to claim 1, the method also comprises the following step: as a function of a maximum physical resolution of the matrix chip, determining an optimum ratio based in each case on the active area of the matrix chip and the binning step level used, and determining the optimum properties for a lens optionally used for the pictures.

13. The method according to claim 1, the method also comprises the following step: taking an additional picture of the first portion at a third point in time using the first binning step level, wherein a different active area of the matrix chip (20) is used for the additional picture of the first portion than for the first picture of the first portion.

14. The method according to claim 13, the third point in time is after the first point in time, wherein the third point in time is before the second point in time or after the second point in time.

15. The method according to claim 13, different types of lighting are used to light the material web (10) for the two pictures of the first portion.

16. The method according to claim 1, the method also comprises the following step: taking an additional picture of the second portion at a fourth point in time using the second binning step level, wherein a different active area of the matrix chip is used for the additional picture of the second portion than for the second picture of the second portion, wherein different types of lighting are used to light the material web for the two pictures of the second portion.

17. The method according to claim 16, the fourth point in time is after the second or after the third point in time.

18. The method according to claim 1, a multiplicity of cameras are used, each of which has a matrix chip with a binning function, wherein each of the cameras takes pictures.

19. A device for monitoring and/or inspecting material webs which are moving in the direction of a material web length (y) and/or a material web width (x), comprising:
- a camera which comprises a high-resolution matrix chip, wherein the matrix chip has a binning function; and
- a control unit;
- wherein the control unit is designed to have during monitoring and/or inspection the material web
- a first picture of a first portion of the material web taken at a first point in time with the camera (110); and
- a second picture of a second portion of the material web taken at a second point in time with the camera (110);
- wherein the first material web portion and the second material web portion are selected from the group of material web portions consisting of two identical or corresponding material web portions, or wherein the second material web portion is selected from the group of web portions consisting of a subsidiary portion of the first portion of the web material (10) and a corresponding subsidiary portion of the first portion of the material web (10); and
- wherein, for the first picture, a first binning step level is used in which in each case a first number of pixels of the matrix chip are grouped together using the binning function and, for the second picture, a second binning step level is used in which in each case a second number of pixels of the matrix chip are grouped together using the binning function, and in that the first number of pixels which are in each case grouped together is higher than the second number of pixels which are in each case grouped together, as a result of which a physical zoom function is achieved for the second picture;
- wherein the control unit is designed, for the first picture, to use a first active area (22) of the matrix chip (20) in order to cover a first field of vision and, for the second picture, to use a second active area (24) of the matrix chip (20) in order to cover a second field of vision, wherein the first active area (22) and correspondingly the first field of vision are at least equally as large as the second active area (24) and correspondingly the second field of vision; and
- wherein the first active area (22) and the second active area (24) are not identical.

20. The device according to claim 19, wherein the first area and the second area overlap or do not overlap, and wherein the control unit is designed to evaluate the first picture and to determine a position of at least one error on the material web; and to determine the second binning step level and/or the second active area (24) on the basis of the position of the error on the material web.

21. The device according to claim 20, the control unit is designed to take the second picture at the second point in time on the basis of the position of the error.

22. The device according to claim 19, the device also comprises a sensor which is designed to determine the distance travelled by or the speed of the material web in the direction of the material web length (y) and to provide corresponding signals.

23. The device according to claim 19, the matrix chip is divided into first and second parts, wherein the first part operates at the first binning step level and is used for the first picture and the second part operates at the second binning step level and is used for the second picture, in particular wherein the second part is arranged behind the first part in the direction of movement of the material web.

24. The device according to claim 23, the control unit is designed to have first pictures continually taken with the first part and second pictures continually taken with the second part, in particular wherein the second pictures are continually saved in a ring memory and optionally wherein the control unit is designed to have corresponding second pictures read from the ring memory and/or provided and/or displayed on a display for a user if at least one error has been found in corresponding first pictures.

25. The device according to claim 19, the control unit is also designed to have an optimum ratio based in each case on the active area of the matrix chip and the binning step level used determined as a function of a maximum physical resolution of the matrix chip.

26. The device according to claim 19, the material web has repeats, and in that the control unit is designed to process corresponding trigger signals which are provided to the device per repeat, wherein the control unit is designed to determine the first point in time on the basis of a first trigger signal and to determine the second point in time on the basis of a second trigger signal so that the first and second portions represent corresponding portions on the material web.

27. The device according to claim 26, the trigger signals are provided by the control unit, wherein the control unit receives information from the sensor, wherein the control unit is provided as an external instrument or wherein the control unit is integrated directly into the camera.

28. The device according to claim 19, the control unit is designed to have an additional picture of the first portion taken at a third point in time using the first binning step level, wherein a different active area of the matrix chip is used for the additional picture of the first portion than for the first picture of the first portion.

29. The device according to claim 28, the control unit is designed to have the third point in time be after the first point in time, in particular wherein the third point in time is before the second point in time or after the second point in time.

30. The device according to claim 28, wherein the device includes first and second lighting types, the first lighting type being used to light a first picture of the first portion of the material web and the second lighting type being used to light a second picture of the first portion of the material web.

31. The device according to claim 28, the control unit is designed to have an additional picture of the second portion taken at a fourth point in time using the second binning step level, wherein a different active area of the matrix chip is used for the additional picture of the second portion than for the second picture of the second portion, in particular wherein different types of lighting are used to light the material web for the two pictures of the second portion.

32. The device according to claim 31, the control unit is designed to have the fourth point in time be after the second point in time or after the third point in time.

33. The device according to claim 19, the device has a multiplicity of cameras, each of which has a matrix chip with a binning function, wherein the control unit is designed to have each of the cameras take pictures.

34. The device according to claim 19, at least one camera is provided on a front side of the material web and at least one camera is provided on a rear side of the material web, wherein the control unit is designed to have each of the cameras take pictures corresponding to claim 21.

* * * * *